United States Patent [19]

Kozuka et al.

[11] 3,943,223
[45] Mar. 9, 1976

[54] METHOD OF MANUFACTURING ACRYLIC FIBERS

[75] Inventors: Ko Kozuka, Takasago; Shunichiro Kurioka, Kobe; Taizo Yasumoto; Shigeru Kobayashi, both of Akashi; Atsuo Kubota, Takasago; Nobumasa Otoshi, Kobe, all of Japan

[73] Assignee: Kanegafuchi Kagaku Kogyo Kabushiki Kaisha, Osaka, Japan

[22] Filed: June 14, 1974

[21] Appl. No.: 479,334

Related U.S. Application Data

[63] Continuation of Ser. No. 169,474, Aug. 5, 1971, abandoned.

[30] Foreign Application Priority Data

Dec. 2, 1970  Japan............................ 45-107307
Dec. 7, 1970  Japan............................ 45-107602
Dec. 7, 1970  Japan............................ 45-107603

[52] U.S. Cl. .............................. 264/182; 264/210 F
[51] Int. Cl.$^2$............................................ D01F 6/18
[58] Field of Search .......... 264/182, 210 F; 260/837

[56] References Cited
UNITED STATES PATENTS

| | | |
|---|---|---|
| 3,095,427 | 6/1963 | Kelso .................................. 264/182 |
| 3,414,957 | 12/1968 | Langstaff et al. .................. 264/182 |
| 3,423,481 | 1/1969 | Mizutani............................. 260/836 |

FOREIGN PATENTS OR APPLICATIONS

| | | |
|---|---|---|
| 43-6378 | 3/1968 | Japan.................................. 264/182 |
| 43-19509 | 10/1968 | Japan.................................. 264/182 |
| 45-2770 | 1/1970 | Japan.................................. 264/182 |
| 45-25861 | 8/1970 | Japan.................................. 264/182 |

*Primary Examiner*—Jay H. Woo
*Attorney, Agent, or Firm*—Moonray Kojima

[57] ABSTRACT

A method of manufacturing acrylic fibers free from delustering in boiling water, comprises the steps of forming a spinning solution by dissolving in a solvent of Aceton et al, (a) a copolymer consisting of (1) 30 – 80% acrylonitril and (2) 70 – 20% vinyl chloride or vinylidenechloride, or (b) a tripolymer consisting of (1), (2) and (3) 3.0% or less by weight of ethylenically unsaturated monomer having hydrophilic radicals, and adding one or more compound selected from the group of (1) homopolymer or copolymer of glycidyl methacrylate and (2) specific organic tin compounds, and spinning said spinning solution into a first bath consisting of 60% or less said organic solvent-water and leading said yarn in a 2nd bath consisting of 61 – 85% said organic solvent-water and then in a 3rd and more bath consisting of less than 60% said organic solvent-water and drying, drawing out and annealing said yarn by ordinary methods.

7 Claims, No Drawings

METHOD OF MANUFACTURING ACRYLIC FIBERS

This is a continuation of application Ser. No. 169,474, filed Aug. 5, 1971, now abandoned.

This invention relates to a method of manufacturing acrylic fibers by wet spinning, said fibers being superior in quality and free from delustering attendant upon dyeing in a dyeing bath, steam treatment or the like. Acrylic fibers — which consist of 30 - 80% (by weight, the same applies hereinafter) acrylonitrile (1) and 70 - 20% vinyl chloride or vinylidene chlroide (2) or of (1), (2) and an amount of less than 3.0% ethylenically unsaturated monomer having a hydrophilic group (3) — lose transparency and turn milky in their fiber structures through dyeing, steam treatment or the like, thus developing a defect of what is called delustering. Heretofore, no satisfactory fibers that have obviated such a defect have yet been available. Various reasons can be given for this fact but the main reason is that acrylic fibers, because they are generally manufactured by wet spinning, tend to make minute spaces in the fiber structures and that moreover the fibers, because they are low in softening temperature, tend to swell relatively easily at a temperature of about 100°C.

As a result, an attempt has been made to make up for the disadvantages of the described kind by carrying out dyeing treatment at low temperatures, preventing delustering by use of a dyeing assistant, or by relustering through drying treatment after dyeing. Further, because it is impossible to make steam treatment also in fiber processing other than dyeing processing, inadequate drying treatment is instead carried out in certain cases. But the treatments of the character described give rise to a decrease in work efficiency and an increase in cost, and are not satisfactory at all. The method of manufacturing acrylic fiber according to the invention is an epoch-making method of manufacturing arcylic fibers which are free from delustering, one of their disadvantages, consequent upon dyeing processing, steam treatment or the like. This method of manufacture is the one stablished by the fact that, after an extensive study of numerous process by which delustering is prevented at each stage of processing such as a resin manufacturing process, process manufacturing a spinning solution, spinning process, the present inventor has found the most effective combination of the processes which have an unanticipatably good effect on the prevention of delustering.

That is to say, at the resin manufacturing process, a copolymer consisting of acrylonitrile, vinyl chloride or vinylidene chloride and ethylenically unsaturated monomer having a hydrophilic group as a third component is easy to form not granular but reticular structure precipitation during spinning and accordingly it produces a good effect on the production of fiber of uniform and compact structure.

Further at the spinning stage of processing, a spinning method which makes the fiber structure as uniform and fine as possible in time of forming filaments is desirable, and hence it has been found that the manufacture of fibers which are not delustered in time of dyeing processing by a suitable combination of spinning bath compositions by use of many spinning baths is possible. A further description of various detailed requirements at each stage of process will now be made in the following.

First, a resin composition is (A) a copolymer consisting of (1) 30 - 80% acrylonitrile, and (2) 70 - 20% vinyl chloride or vinylidene chloride, or (B) a tripolymer consisting of (1), (2) and (3) a 30% or less ethylenically unsaturated monomer having a hydrophilic group. A spinning solution is manufactured by dissolving said copolymer by an organic solvent. Normally, 18 - 25% resin concentration is employed.

As the organic solvent, is used a solvent which dissolves a raw copolymer resin, such as for example acetone, acetonitrile or dimethylformamide. When acrylonitrile content of the copolymer resin is small, it can be dissolved in any one of these solvents, but in proportion as acrylonitrile content becomes greater, the solubility of the copolymer in acetone is inferior, and the copolymer resin becomes soluble only in acetonitrile, dimethylformamide or mixture of these solvents. For instance, acrylonitrile-vinyl chloride series copolymers containing 30 - 50% acrylonitrile dissolve well in acetone, and those containing 50 - 75% do likewise in acetonitrile, and those containing more than 75% do likewise in dimethylformamide. When the raw resin composition contains less than 30% acrylonitrile and more than 70% vinyl chloride or vinylidene chloride, it cannot retain those feeling and touch to hand which acrylic fibers should have and is not suitable. Furthermore, by means of copolymerizing an ethylenically unsaturated monomer having a hydrophilic group with above-mentioned monomers, these copolymer becomes more effective for the prevention of delustering. The ethylenically unsaturated monomer having a hydrophilic group referred to herein includes sulfopropyl methacrylate, sodium parastyrene sulfonate, sodium methacroyloxybenzene sulfonate, sodium allyl sulfonate, sodium methallyl sulfonate, sodium acrylate, sodium itaconate and the like.

Next, addition of the following substances are found very effective for improvement in delustering; those are (1) a polymer of glycidyl methacrylate, (2) compounds produced from dialkyl tin oxide and dialkyl tin phthalate, represented by the following structural formulas (I) or (II):

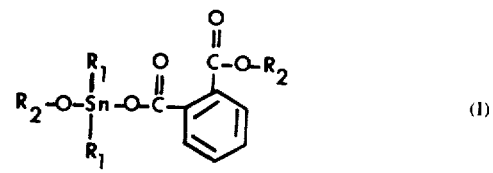

(I)

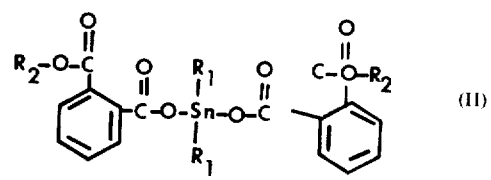

(II)

(wherein $R_1$ represents an alkyl group having 2 - 8 carbon atoms, and $R_2$ denotes an alkyl group having 1 - 12 carbon) and (3) dialkyl tin malate or dialkyl tin bis monoalkyl malate represented by the following formulas (III), (IV) and (V).

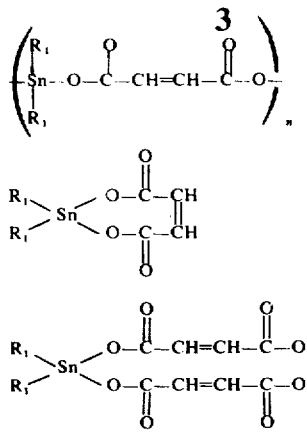

(wherein $R_1$ represents an alkyl group having 2 – 8 carbon atoms and $R_2$ represents an alkyl group having 1 – 12 carbon and $n$ represents a positive integer.) When the number of carbons of alkyl group exceeds 12, a rate of delustering increases perhaps because of the reduction in compatibility with the resin. The characteristic features of these compounds are that the compounds are very effective for the prevention of delustering when treated in boiling water. The polymer of glycidyl methacrylate in (1) may be either a homopolymer of glycidyl methacrylate or a copolymer of 70% or less ethylenically unsaturated monomer of one or two kinds, such as methyl acrylate, methyl methacrylate, methyl acetate, acrylonitrile, vinyl acetate vinyl chloride, vinylidene chloride, styrene, vinyl pyrrolidone, etc., polymerizable with 30% or more glycidyl methacrylate. The specific viscosity of the single polymer or copolymer of glycidyl methacrylate at a temperature of 30°C of a 2.0 g/l acetone solution is preferably 0.01 – 0.50. When the specific viscosity becomes lower than 0.01, these polymers tend to be dissolved in a spinning bath, and when the specific viscosity becomes higher than 0.50, there begins to appear a tendency that an effect on an improvement in delustering is weakened. Furthermore, the single polymer or the copolymer of glycidyl methacrylate may be used as an additive or may be used together with other stabilizer which does not produce an adverse effect on delustering. In either case it is advisable to use glycidyl methacrylate in a ratio of 0.2 – 30.0% preferably 0.5 – 5.0% to an acrylic resin composition. When the amount of glycidyl methacrylate used is less than 0.2%, no tangible effect can be expected and when the amount is more than 30.0%, it is effective for improvement in delustering, but is not recommendable because it deteriorates the other properties of the fiber. As the amount of tin compounds of (2) and (3) used, it is advisable to use the compounds in a ratio of 0.2 – 10.0%, preferably 0.5 – 5.0% to a multicomponent copolymer resin which is obtained by polymerizing more than two monomers. When the amount used is less than 0.2%, an effect on improvement in delustering due to boiling water treatment is little, while on the other hand, the use of more than 10.0% is not recommendable either in view of the fiber properties.

Next, as for spinning conditions, a multiple bath spinning method comprising two or more baths is employed. Particularly, the concentration of the first bath and that of the second bath are important, and even when any of acetone, acetonitrile and dimethylformamide is used as a solvent, the concentration of the first bath must be lower than 60% and that of the second bath must be 61 –85% aqueous solution concentration higher than that of the first bath. When the third bath and subsequent bath are used, it is recommended that those baths be again lower than 60% in solution concentration and that they be gradually decreased in solution concentration in proportion to an increase in the number of baths. And in order to remove the solvent left attached to a fiberous material, a spinning step of process is finished by ultimately passing the material through the bath consisting of water only and containing no solvent. Subsequently, the material is dried in a conventional manner and thermally drawn out to obtain intended acrylic fibers.

What is important in this invention is that only when all the manufacturing conditions in the aforesaid steps of manufacture are met, the method of the invention brings its merits into full play and a lack of any one of the conditions cannot produce the intended satisfactory fibers. Embodiments of the invention will be shown hereinbelow.

EXAMPLE 1

An acrylic resin (specific viscosity 0.161 at 30°C of a 2.0 g/l cyclohexanone solution) consisting of 32.0% acrylonitrile, 67.0% vinyl chlroide, and 1.0% sodium parastyrene sulfonate was dissolved in acetone so as to be 24.0% in resin concentration, and homopolymer of glycidyl methacrylate (specific viscosity 0.091 at 30°C of a 4.0 g/l acetone solution) was used as an additive to a spinning solution in a ratio of 3.0% to the acrylic resin. The spinning solution thus prepared was spun by use of a nozzle having 300 holes each 0.10 mm in diameter in a spinning bath consisting of the first bath of an aqueous solution of 10% acetone concentration, the second bath of an aqueous solution of 75% acetone concentration, the third bath of an aqueous solution of 50% acetone concentration, and the fourth bath of water, then dried at 120°C, further thermally drawn out 300% and heat treated at 140°C for 5 minutes to obtain fibers. The acrylic fibers thus obtained underwent little or no delustering even when treated in boiling water and was excellent also in heat and light resistance.

In contrast thereto, ordinary acrylic fibers produced from a spinning solution prepared from the above acrylic resin by adding 3.0% epoxy-based EPON 834 (trademark for a product by Shell Petroleum Company) thereto under the spinning conditions of an ordinary spinning method consisting of the 1st bath of an aqueous solution of 40% acetone concentration, the second bath of an aqueous solution of 20% acetone concentration, and the third bath of water, or ordinary acrylic fibers spun by the same spinning method without an additive used was readily delustered by boiling water treatment and inferior in quality.

EXAMPLE 2

An acrylic resin (specific viscosity of 0.234 at 30°C of a 2.09 g/l cyclohexanone solution) consisting of 41.0% acrylonitrile, 58% vinyl chloride, 1.0% sodium methacroyloxybenzene sulfonate was dissolved in 20.0% acetone concentration, and a copolymerized resin composition (specific viscosity 0.110 at 30° C of a 4.0 g/l acetone solution) consisting of 80% glycidyl methacrylate and 20% methyl acrylate was used as an additive thereto in a ratio of 5.0% to said acrylic resin. The spinning solution thus prepared was spun by use of a nozzle having 300 holes each 0.10 mm in diameter in a spinning bath consisting of the first bath of an aqueous solution of 30% acetone concentration, the second bath of an aqueous solution of 70% acetone concentration, and the fourth bath of water, then dried at 120°C, further thermally drawn out 300% and heat treated at 140°C for 5 minutes to obtain fibers. The acrylic fibers thus obtained showed little or no delustering even when treated in boiling water, and was excellent in heat and light resistance, when compared with those obtained by the ordinary spinning method shown by the contrast described in Example 1.

EXAMPLE 3

Acrylic resin (specific viscosity 0.253 at 30°C of a 2.0 g/l cyclohexanone solution) consisting of 50% acrylonitrile, 46.0% vinyl chloride, 3.0% methyl methacrylate, 1.0% sodium parastyrene sulfonate was dissolved in acetone so as to be 18.0% in resin concentration, and a copolymerized resin composition (specific viscosity 0.121 at 30°C of a 4.0 g/l acetone solution) consisting of 60% glycidyl methacrylate and 40% methyl methacrylate was added thereto as an additive to a spinning solution in a ratio of 10.0% to the acrylic resin. The spinning solution thus prepared with the additive mixed was then spun by use of a nozzle having 300 holes each 0.10 mm in diameter in a spinning bath consisting of the 1st bath of an aqueous solution of 20% acetone concentration, the second bath of an aqueous solution of 85% acetone concentration, the third bath of an aqueous solution of 30% acetone concentration, the fourth bath of an aqueous solution of 10% acetone concentration, and the fifth bath of water, then dried at 120°C, thermally drawn out 300%, and heat treated at 140°C for 5 minutes to obtain fibers. The acrylic fiber thus obtained showed little or no delustering, and was excellent in heat and light resistance, when compared with those produced from the above acrylic resin by the ordinary spinning method shown in the contrast described in Example 1.

EXAMPLE 4

An acrylic resin (specific viscosity 0.321 at 30°C of a 2.0 g/l cyclohexanone solution) consisting of 40.0% acrylonitrile, 56.5% vinyl chloride, 3.0% methyl methacrylate, and 0.5% sodium parastyrene sulfonate was dissolved in acetone to prepare a 21% acetone solution. To the solution was added as an additive a copolymerized resin composition (specific viscosity 0.120 at 30°C of a 4.0 g/l acetone solution) consisting of 80% glycidyl methacrylate and 20% vinyl acetate in a ratio of 5.0% to the acrylic resin. The spinning solution thus prepared was spun by use of a nozzle having 300 holes each 0.10 mm in diameter in a spinning bath consisting of the first bath of an aqueous solution of 15% acetone concentration, the second bath of an aqueous solution of 80% acetone concentration, the third bath of an aqueous solution of 50% acetone concentration, the fourth bath of an aqueous solution of 30% acetone concentration and the fifth bath of water, then dried at 120°C, further thermally drawn out 300% and heat treated at 140°C for 5 minutes. The acrylic fibers thus obtained showed little or no delustering even when treated in boiling water and was excellent also in heat and light resistance, when compared with the acrylic fibers prepared from the above acrylic resin by the ordinary spinning method shown in the contrast described in Example 1.

EXAMPLE 5

Acrylic resin (specific viscosity 0.285 at 30°C of a 2.0 g/l dimethylformamide solution) consisting of 61.0% acrylonitrile, 38.5% vinyl chloride, 0.5% sodium allyl sulfonate was dissolved in acetonitril so as to be 20.0% in resin concentration and a copolymerized resin composition (specific viscosity 0.101 at 30°C of a 4.0 g/l acetone solution) consisting of 70% glycidyl methacrylate, 20% methyl acrylate, 10% vinyl acetate was added thereto as an additive to a spinning solution in a ratio of 7.0% to the acrylic resin. The spinning solution thus prepared was spun by use of a nozzle having 300 holes each 0.10 mm in diameter in a spinning bath consisting of the first bath of an aqueous solution of 15% acetonitrile concentration, the second bath of an aqueous solution of 75% acetonitrile concentration, the third bath of an aqueous solution of 40% acetonitrile concentration and the fourth bath of water, then dried at 125°C, thermally drawn out 250% and heat treated at 140°C for 5 minutes to obtain fibers. The acrylic fibers thus obtained showed little or no delustering even when treated in boiling water, and was excellent in heat and light resistance, when compared with the ordinary acrylic fibers produced from the spinning solution prepared by adding 5.0% epoxy-based EPON 1001 (trademark for a product by Shell Petroleum Company) to the above acrylic resin and under the spinning conditions provided by baths consisting of the first bath of an aqueous solution of 40% acetonitrile concentration, the second bath of an aqueous solution of 60% acetonitrile concentration, the third bath of an aqueous solution of 35% acetonitrile concentration and the fourth bath of water.

EXAMPLE 6

An acrylic resin (specific viscosity 0.345 at 30°C of a 2.0 g/l cyclohexanone solution) consisting of 49.0% acrylonitrile, 50.5% vinylidene chloride, and 0.5% sodium methacroyloxybenzene sulfonate was dissolved in a mixed solvent of acetonitrile and dimethylformamide (ratio by weight 50 : 50) so as to be 20.0% in resin concentration. To the resultant solution was added as an additive to a spinning solution a homopolymer of glycidyl methacrylate (specific viscosity 0.091 at 30°C of a 4.0 g/l acetone solution) in a ratio of 2.0% to said acrylic resin. The spinning solution thus prepared was spun by use of a nozzle having 300 holes each 0.10 mm in diameter in a spinning bath consisting of the first bath of an aqueous solution of 50% said solvent concentration, the second bath of an aqueous solution of 63% said mixed solvent concentration, the third bath of an aqueous solution of 20% said mixed solvent concentration and the fourth bath of water, then dried at 110°C, further thermally drawn out 250% and heat treated at 140°C for 5 minutes to obtain fibers. The acrylic fibers thus obtained showed little or no delustering even when treated in boiling water and was excellent also in heat and light resistance, when compared with the ordinary acrylic fibers produced from the spinning solution by adding epoxy-based EPON 812 (trademark for a product by Shell Petroleum Company) to the above acrylic resin and under the spinning conditions provided by a spinning bath composition including the first bath of an aqueous solution of 60% said mixed solvent concentration, the second bath of an aqueous solution of 45% said mixed solvent concentration, and the third bath of water.

EXAMPLE 7

An acrylic resin (specific viscosity 0.300 at 30°C of 2.0 g/l dimethylformamide solution) consisting of 5.0% acrylonitrile, 24.0% vinyl chloride, 1.0% sodium methacroyloxybenzene sulfonate was dissolved in a mixed solvent of acetonitrile and dimethylformamide (ratio by weight 30 : 70) so as to be 21% in resin concentration. To the resultant solution was added an an additive to a spinning solution a copolymerized resin composition (specific viscosity 0.121 at 30°C of a 4.0 g/l acetone solution) consisting of 60% glycidyl methacrylate and 40% methyl methacrylate in a ratio of 5.0% to the acrylic resin. The spinning solution thus prepared was spun by use of a nozzle having 300 holes each 0.10 mm in diameter in a spinning bath consisting of the first bath of an aqueous solution of 35% said mixed solvent concentration, the second bath of an aqueous solution of 80% said mixed solvent concentration, the third bath of an aqueous solution of 55% said mixed solvent concentration, and the fourth bath of water, then dried at 120°C, further thermally drawn out 300% and heat treated at 150°C for 5 minutes. The resultant acrylic fibers produced showed little or no delustering even when treated in boiling water and was excellent also in heat and light resistance, when compared with the ordinary acrylic fibers produced from the spinning solution prepared by adding 5.0% epoxy-based EPON 834 (trademark for a product by Shell Petroleum Company) to the above acrylic resin and under the spinning conditions provided by a spinning bath consisting of the first bath of an aqueous solution of 35% said mixed solvent concentration, the second bath of an aqueous solution of 10% said mixed solvent concentration, and the third bath of water.

EXAMPLE 8

An acrylic resin (specific viscosity 0.331 at 30°C of a 2.0 g/l dimethylformamide solution) consisting of 60% acrylonitrile, 37.0% vinylidene chloride, 2.0% methyl methacrylate, 1.0% sodium allyl sulfonate was dissolved in dimethylformamide so as to be 18.0% in resin concentration. To the resultant solution was added as an additive to a spinning liquid a copolymerized resin composition (specific viscosity 0.101 at 30°C of a 4.0 g/l acetone solution consisting of 70% glycidyl methacrylate, 20% methyl methacrylate and 10% vinyl acetate in a ratio of 6.0% to the acrylic resin. The spinning solution thus prepared was spun by use of a nozzle having 300 holes each 0.10 mm in diameter in a spinning bath consisting of the first bath of an aqueous solution of 25% dimethylformamide concentration, the second bath of an aqueous solution of 80% dimethylformamide concentration, the third bath of an aqueous solution of 20% dimethyl formamide concentration, and the fourth bath of water, then dried at 120°C, further thermally drawn out 300% and heat treated at 150°C for 5 minutes to obtain fibers. The resultant acrylic fibers showed little or no delustering even in boiling water treatment and were fibers of excellent quality, when compared with the acrylic fibers produced by use of the above acrylic resin according to the ordinary spinning bath concentration composition shown in the contrast described in Example 7.

EXAMPLE 9

An acrylic resin (specific viscosity 0.311 at 30°C of a 2.0 g/l dimethylformamide solution) consisting of 75.0% acrylonitrile, 24.0% vinylidene chloride, and 1.0% sodium parastyrene sulfonate was dissolved in dimethyformamide so as to be 20.0% in resin concentration. To the resultant solution was added in the form of an additive to a spinning solution a copolymerized resin composition (specific viscosity 0.110 at 30°C of a 4.0 g/l acetone solution) consisting of 80% glycidyl methacrylate, and 20% methyl acrylate in a ratio of 3.0% to the acrylic resin. The spinning solution was spun by use of a nozzle having 300 holes each 0.10 mm in diameter in a spinning bath consisting of the first bath of an aqueous solution of 40% dimethylformamide concentration, the second bath of an aqueous solution of 75% dimethylformamide concentration, the third bath of an aqueous solution of 55% dimethylformamide concentration and the fourth bath of water, then dried at 110°C, further thermally drawn out 300% and heat treated at 150°C for five minutes to obtain fibers. The acrylic fibers thus obtained showed little or no delustering even when treated in boiling water and were fibers of superior quality, when compared with the acrylic fibers produced from said acrylic resin under the ordinary spinning bath concentration composition shown in the contrast described in Example 7.

EXAMPLE 10

An acrylic resin (specific viscosity 0.301 at 30°C of a 2.0 g/l cyclohexanone solution) consisting of 31.0% acrylonitrile, 68% vinylidene chloride, and 1.0% sodium allyl sulfonate was dissolved in acetone so as to be 20% in resin concentration. To the resultant solution was added as an additive to a spinning solution a copolymerized resin composition (specific viscosity 0.120 at 30°C of a 4.0 g/l acetone solution) consisting of 80% glycidyl methacrylate and 20% vinyl acetate in a ratio of 4.0% to the acrylic resin. The spinning solution thus prepared was spun by use of a nozzle having 300 holes 0.10 mm each in diameter in a spinning bath comprising the first bath of an aqueous solution of 25% acetone concentration, the second bath of an aqueous solution of 85% acetone concentration, the third bath of an aqueous solution of 50% acetone concentration, the fourth bath of an aqueous solution of 20% acetone concentration and the fifth bath of water, then dried at 120°C, further drawn out 300% and heat treated at 140°C for five minutes to obtain fibers. The acrylic fibers thus obtained showed little or no delustering even when treated in boiling water and were excellent also in heat and light resistance, when compared with the acrylic fibers produced from said acrylic resin under the ordinary spinning bath composition shown in the contrast described in Example 7.

EXAMPLE 11

An acrylic resin (specific viscosity 0.234 at 30°C of a 2.0 g/l cyclohexanone solution) consisting of 41.0% acrylonitrile, 58.0% vinyl chloride, 1.0% sodium methacroyloxybenzene sulfonate was dissolved in acetone so as to be 20.0% in resin concentration. To the resultant solution was added dibutyl tin bis monobutyl phthalate as an additive to a stock spinning liquid in a ratio of 3.0% to the acrylic resin. The spinning solution thus prepared was spun by use of a nozzle having 300 holes each 0.10 mm in diameter in a spinning bath comprising the first bath of an aqueous solution of 15% acetone concentration, the second bath of an aqueous solution of 75% acetone concentration, the third bath of an aqueous solution of 45% acetone concentration and the fourth bath of water, then dried at 120°C, further thermally drawn out 300% and heat treated at 140°C for 5 minutes to obtain fibers. The acrylic fibers thus obtained showed little or no delustering even when treated in boiling water, and were excellent also in heat and light resistant.

In constrast thereto, ordinary acrylic fibers produced from a spinning solution prepared from the above acrylic resin by adding 2.0% dibutyl tin dilaurate to the acrylic resin under the ordinary spinning conditions consisting of the first bath of an aqueous solution of 40% acetone concentration, the second bath of an aqueous solution of 20% acetone concentration and the third bath of water, or ordinary acrylic fibers spun by the same method without the additive applied thereto were readily delustered when treated in boiling water and were inferior in quality.

EXAMPLE 12

The acrylic resin shown in Example 11 was dissolved into a 20.0% acetone solution. To the resultant solution was added dibutyl tin methoxy monomethyl phthalate as an additive in a ratio of 2.0% to the acrylic resin. The spinning solution was spun by use of a nozzle having 300 holes each 0.10 mm in diameter in a spinning bath consisting of the first bath of an aqueous solution of 30% acetone concentration, the second bath of an aqueous solution of 70% acetone concentration, the third bath of an aqueous solution of 40% acetone concentration and the fourth bath of water, then dried at 120°C, further thermally drawn out 300% and heat treated at 140°C for 5 minutes to obtain fibers. The acrylic fibers thus obtained showed little or no delustering even when treated in boiling water and was excellent also in heat and light resistance.

EXAMPLE 13

An acrylic resin (specific viscosity 0.301 at 30°C of a 2.0 g/l cyclohexanone solution) consisting of 31.0% acrylonitrile, 68.0% vinylidene chloride, and 1.0% sodium allyl sulfonate was dissolved in acetone so as to be 20.0% in resin concentration. To the resultant solution was added dibutyl tin octooxymonooctyl phthalate as an additive to a stock spinning liquid in a ratio of 4.0% to the acrylic resin. The spinning solution thus prepared was spun by use of a nozzle having 300 holes each 0.10 mm in diameter in a spinning bath consisting of the first bath of an aqueous solution of 15% acetone concentration, the second bath of an aqueous solution of 80% acetone concentration, the third bath of an aqueous solution of 50% acetone concentration, the fourth bath of an aqueous solution of 10% acetone concentration and the fifth bath of water, then dried at 120°C, further thermally drawn out 300% and heat treated at 140°C for 5 minutes to obtain fibers. The acrylic fibers thus obtained were almost free from delustering even when treated in boiling water and excellent also in heat and light resistance, when compared with the acrylic fibers produced from said acrylic resin by the ordinary spinning method shown in the contrast described in Example 11.

EXAMPLE 14

An acrylic resin (specific viscosity 0.285 at 30°C of a 2.0 g/l dimethylformamide solution) consisting of 61.0% acrylonitrile, 38.5% vinyl chloride, and 0.5% sodium allyl sulfonate was dissolved in acetonitrile into a 20.0% acetonitrile solution, to which was added dibutyl tin bismonolauryl phthalate as an additive in a ratio of 3.0% to the acrylic resin. The spinning solution thus prepared was spun by use of a nozzle having 300 holes each 0.10 mm in diameter in a spinning bath consisting of the first bath of an aqueous solution of 20% acetonitrile concentration, the second bath of an aqueous solution of 85% acetonitrile concentration, the third bath of an aqueous solution of 30% acetonitrile concentration, the fourth bath of an aqueous solution of 10% acetonitrile concentration and the fifth bath of water, then dried at 120°C, further thermally drawn out 300% and heat treated at 140°C for 5 minutes to obtain fibers. The acrylic fibers thus obtained showed little or no delustering even when treated in boiling water and were excellent also in heat and light resistance, when compared with the acrylic fibers obtained by the ordinary spinning bath concentration composition shown in the contrast described in Example 17.

EXAMPLE 15

An acrylic resin (specific viscosity 0.250 at 30°C of a 2.0 g/l cyclohexanone solution) consisting of 50.0% acrylonitrile, 46.0% vinyl chloride, 1.0% sodium parastyrene sulfonate and 3.0% methyl methacrylate was dissolved in acetone so as to be 18.0% in resin concentration. To the resultant solution was added dioctyl tin bismonooctyl phthalate as an additive to a spinning solution in a ratio of 2.0% to the acrylic resin. The spinning solution thus prepared was spun by use of a nozzle having 300 holes each 0.10 mm in diameter in a spinning bath comprising the first bath of an aqueous solution of 15% acetone concentration, the second bath of an aqueous solution of 75% acetone concetration, the third bath of an aqueous solution of 50% acetone concentration, and the fourth bath of water, then dried at 125°C, further thermally drawn out 250% and heat treated at 140°C for five minutes to obtain fibers. The acrylic fibers thus obtained were almost free from delustering even when treated in boiling water and were excellent also in heat and light resistance, when compared with the ordinary acrylic fibers produced from said acrylic resin by using the resin as a spinning solution with 20% dibutyl tin distearate added to the resin and by spinning said solution in spinning baths composition consisting of the first bath of an aqueous solution of 40% acetone concentration, the second bath of an aqueous solution of 60% acetone concentration and the third bath of water.

EXAMPLE 16

An acrylic resin (specific viscosity 0.341 at 30°C of a 2.0 g/l dimethylformamide solution) consisting of 75.0% acrylonitrile, 24.0% vinylchloride and 1.0% sodium methacroyloxybenzene sulfonate was dissolved in a mixed solvent of acetonitrile and dimethylformamide (ratio by weight 30 : 70) so as to be 21.0% in resin concentration, and dibutyl tin bismonobutyl phthalate was added thereto as an additive to a spinning solution in a ratio of 4.0% to the acrylic resin. The spinning solution thus prepared was spun by use of a nozzle having 300 holes each 0.10 mm in diameter in a spinning bath consisting of the first bath of an aqueous solution of 45% said mixed solvent concentration, the second bath of an aqueous solution of 65% said mixed solvent concentration, the third bath of an aqueous solution of 20% said mixed solvent concentration and the fourth bath of water, then dried at 110°C, further thermally drawn out 250% and heat treated at 140°C for 5 minutes to obtain fibers. The acrylic fibers thus obtained showed little or no delustering even when treated in boiling water and were excellent also in heat and light resistance, when compared with the ordinary acrylic fibers produced from said acrylic resin by using the resin as a spinning solution with 3.5% dibutyl tin dilaurate added to the resin and by spinning said solution in spinning baths consisting of the first bath of an aqueous solution of 50% said mixed solvent concentration, the second bath of an aqueous solution of 30% said mixed solvent concentration and the third bath of water.

EXAMPLE 17

An acrylic resin (specific viscosity 0.321 at 30°C of a 2.0 g/l cyclohexanone solution) consisting of 40.0% acrylonitrile, 56.5% vinylidene chloride, 3.0% methacrylate and 0.5% sodium parastyrene sulfonate was dissolved in acetone so as to be 21.0% in resin concentration, and dioctyl tin butoxymonobutyl phthalate was added thereto as an additive to a spinning solution in a ration of 2.5% to the acrylic resin. The resultant spinning solution was spun by use of a nozzle having 300 holes each 0.10 mm in diameter in a spinning bath consisting of the first bath of an aqueous solution of 40% acetone concentration, the second bath of an aqueous solution of 65% acetone concentration, the third bath of an aqueous solution of 30% acetone concentration and the fourth bath of water, then dried at 120°C, further thermally drawn out 300% and heat treated at 150°C for 5 minutes to obtain fibers. The acrylic fibers thus obtained showed little or not delustering even when treated in boiling water and were excellent also in heat and light resistance, when compared with the ordinary acrylic fibers produced from said acrylic resin by using the resin as a spinning solution with 3.0% dibutyl tin distearate added to the resin and by spinning said solution into spinning baths consisting of the first bath of an aqueous solution of 45% acetone concentration, the second bath of an aqueous solution of 55% acetone concentration and the third bath of water.

EXAMPLE 18

An acrylic resin (specific viscosity 0.345 at 30°C of a 2.40 g/l dimethylformamide solution) consisting of 49.0% acrylonitrile, 50.0% vinylidene chloride, 0.5% sodium methacroyloxybenzene sulfonate was dissolved in a mixed solvent of dimethylformamide and acetonitrile (ratio by weight 50 : 50) so as to be 20.0% in resin concentration, and dibutyl tin octooxymonooctyl phthalate was added thereto as an additive to a spinning solution in a ratio of 3.5% to the acrylic resin. The spinning solution thus prepared was spun by use of a nozzle having 300 holes each 0.10 mm in diameter in a spinning bath consisting of the first bath of an aqueous solution of 25% said mixed solvent concentration, the second bath of an aqueous solution of 85% said mixed solvent concentration, the third bath of an aqueous solution of 50% said mixed solvent concentration, the fourth bath of an aqueous solution of 10% said mixed solvent concentration, and the fifth bath of water, then dried at 120°C, further thermally drawn out 300% and heat treated at 150°C for 5 minutes to obtain fibers. The acrylic fibers thus obtained were almost free from delustering and excellent also in heat and light resistance, when compared with the acrylic fibers produced from said acrylic resin according to the ordinary spinning bath concentration composition shown in the contrast described in Example 17.

EXAMPLE 19

The acrylic resin shown in Example 18 was dissolved in a mixed solvent of dimethylformamide and acetonitrile (ratio by weight 50 : 50) so as to be 20.0% in resin concentration and dibutyl tin methoxymonomethyl phthalate was added thereto as an additive to a spinning solution in a ratio of 3.5% to the acrylic resin. The spinning solution thus prepared was spun by use of a nozzle having 300 holes each 0.10 mm in diameter in a spinning bath consisting of the first bath of an aqueous solution of 10% said mixed solvent concentration, the second bath of an aqueous solution of 75% said mixed solvent concentration, the third bath of an aqueous solution of 50% said mixed solvent concentration, and the fourth bath of water, then dried at 110°C, further thermally drawn out 300% and heat treated at 150°C for 5 minutes to obtain fibers. The acrylic fibers thus obtained were almost free from delustering even when treated in boiling water and excellent also in heat and light resistance, when compared with the acrylic fibers obtained by the ordinary spinning method shown in the contrast described in Example 17.

EXAMPLE 20

An acrylic resin (specific viscosity 0.311 at 30°C of a 2.0 g/l dimethylformamide solution) consisting of 75.0% acrylonitrile, 24.0% vinylidene chloride and 1.0% sodium parastyrene sulfonate was dissolved in dimethylformamide so as to be 20% in resin concentration and dibutyl tin bismonolauryl phthalate was added thereto as an additive to a spinning solution in a ratio of 2.5% to the acrylic resin. The spinning solution thus prepared was spun by use of a nozzle having 300 holes each 0.10 mm in diameter in a spinning bath consisting of the first bath of an aqueous solution of 20% dimethylformamide concentration, the second bath of an aqueous solution of 85% dimethylformamide concentration, the third bath of an aqueous solution of 50% dimethylformamide concentration, the fourth bath of an aqueous solution of 10% dimethylformamide concentration, and the fifth bath of water, then dried at 120°C, further thermally drawn out 300% and heat treated at 140° C for 5 minutes to obtain fibers. The acrylic fibers thus obtained were almost free from delustering and excellent also in heat and light resistance, when compared with the acrylic fibers produced from said acrylic resin according to the ordinary spinning bath concentration composition shown in the contrast described in Example 17.

EXAMPLE 21

An acrylic resin (specific viscosity 0.253 at 30°C of a 2.0 g/l cyclohexanone solution) consisting of 50.0% acrylonitrile, 46.0% vinyl chloride, 3.05 methyl acrylate, and 1.0% sodium parastyrene sulfonate was dissolved in acetone so as to be 18.0% in resin concentration and dibutyl tin bismonobutyl malate was added thereto an additive to a spinning solution in a ratio of 4.0% to the acrylic resin. The spinning solution thus prepared was spun by use of a nozzle having 300 holes each 0.10 mm in diameter in a spinning bath consisting of the first bath of an aqueous solution of 25% acetone concentration, the second bath of an aqueous solution of 70% acetone concentration, the third bath of an aqueous solution of 50% acetone concentration and the fourth bath of water, then dried at 120°C, further thermally drawn out 300% and heat treated at 140°C for 5 minutes to obtain fibers. The acrylic fibers thus obtained were almost free from delustering even when treated in boiling water and excellent also in heat and light resistance. In contrast thereto, the ordinary acrylic fibers obtained by preparing a spinning solution from the above acrylic resin by adding 4.0% dibutyl tin dilaurate thereto and spinning said solution in baths consisting of the first bath of an aqueous solution of 40% acetone concentration, the second bath of an aqueous solultion of 20% acetone concentration and the third bath of water, which spinning conditions constitute the ordinary spinning method, or the ordinary acrylic fibers produced by the same method without adding the additive was readily delustered when treated in boiling water and were inferior in quality.

EXAMPLE 22

An acrylic resin (specific viscosity 0.161 at 30°C of a 2.0 g/l cyclohexanone solution) consisting of 32.0% acrylonitrile, 67.0% vinyl chloride, and 1.0% sodium parastyrene sulfonate was made into a 24.0% acetone solution, and dibutyl tin malate was added thereto as an additive in a ratio of 3.0% to the acrylic resin. The spinning solution thus prepared was spun by use of a nozzle having 300 holes each 0.10 mm in diameter in spinning baths consisting of the first bath of an aqueous solution of 20% acetone concentration, the second bath of an aqueous solution of 75% acetone concentration, the third bath of an aqueous solution of 40% acetone concentration, and the fourth bath of water, then dried at 120°C, further thermally drawn out 300% and heat treated at 140°C for 5 minutes to obtain fibers. The acrylic fibers thus obtained were almost free from delustering even when treated in boiling water and were excellent also in heat and light resistance, when compared with the acrylic fibers obtained by the ordinary spinning method shown in the contrast described in Example 21.

EXAMPLE 23

An acrylic resin (specific viscosity 0.300 at 30°C of a 2.0 g/l dimethylformamide solution) consisting of 75.0% acrylonitrile, 24.0% vinyl chloride, and 1.0% sodium methacroyloxybenzene sulfonate was dissolved in dimethylformamide so as to be 21.0% in resin concentration and dibutyl tin bismonooctyl malate was added thereto as an additive to a spinning solution in a ratio of 2.0% to the acrylic resin. The spinning solution thus prepared was spun by use of a nozzle having 300 holes each 0.10 mm in diameter in spinning baths consisting of the first bath of an aqueous solution of 25% dimethylformamide concentration, the second bath of an aqueous solution of 85% dimethylformamide concentration, the third bath of an aqueous solution of 40% dimethylformamide concentration, the fourth bath of an aqueous solution of 10% dimethyl concentration and the fifth bath of water, then dried at 120°C, further thermally drawn out 300% and heated at 140°C for 5 minutes. The acrylic fibers thus obtained were almost free from delustering even when treated in boiling water and were excellent also in heat and light resistance, when compared with the acrylic fibers obtained by an ordinary spinning bath combination shown in the contrast described in Example 21.

EXAMPLE 24

An acrylic resin (specific viscosity 0.331 at 30°C of a 2.0 g/l cyclohexanone solution) consisting of 60.0% acrylonitrile 37.0% vinylidene chloride, 2.0% methacrylate and 1.0% sodium allyl sulfonate was dissolved in dimethylformamide to prepare a 18.0% solution, and dibutyl tin bismonolauryl malate was added thereto as an additive in a ratio of 3.5% to the acrylic resin. The spinning solution was spun by use of a nozzle having 300 holes each 0.10 mm in diameter in spinning baths consisting of the first bath of an aqueous solution of 20% dimethylformamide concentration, the second bath of an aqueous solution of 85% dimethylformamide concentration, the third bath of an aqueous solution of 30% dimethylformamide concentration, the fourth bath of an aqueous solution of 10% dimethylformamide concentration, the fifth bath of water, then dried at 120°C, further thermally drawn out 300% and heat treated at 140°C for 5 minutes. The acrylic fibers thus obtained were almost free from delustering even when treated in boiling water and excellent also in heat and light resistance, when compared with the acrylic fibers obtained by an ordinary spinning bath concentration combination shown in the contrast described in Example 21.

EXAMPLE 25

An acrylic resin (specific viscosity 0.234 at 30°C of a 2.0 g/l cyclohexanone solution) consisting of 41.0% acrylonitrile, 58.0% vinyl chloride, and 1.0% sodium methacroyloxybenzene sulfonate was dissolved to be 20.0% in resin concentration, and dibutyl tin bismonomethyl malate was added thereto as an additive to a spinning solution in a ratio of 1.0% to the acrylic resin. The spinning solution thus prepared was spun by use of a nozzle having 300 holes each 0.10 mm in diameter in spinning baths consisting of the first bath of an aqueous solution of 10% acetone concentration, the second bath of an aqueous solution of 75% acetone concentration, the third bath of an aqueous solution of 50% concentration, and the fourth bath of water, then dried at 125°C, further thermally drawn out 250% and heat treated at 140°C for 5 minutes to obtain fibers. The acrylic fibers thus obtained were almost free from delustering even when treated in boiling water and were fibers of superior quality, when compared with the acrylic fibers obtained by preparing a spinning solution from the above acrylic resin by adding 1.0% dibutyl tin distearate thereto and spinning said solution in baths consisting of the first bath of an aqueous solution of 50.0% acetone concentration, the second bath of an aqueous solution of 30.0% acetone concentration, and the third bath of water, which spinning conditions constitute an ordinary spinning method.

EXAMPLE 26

An acrylic resin (specific vicsocity 0.285 at 30°C of a 2.0 g/l dimethylformamide solution) consisting of 61.0% acrylonitrile, 38.5% vinyl chloride, and 0.5% sodium allyl sulfonate was dissolved in acetonitrile so as to be 20.0% in resin concentration, and dibutyl tin bismonobutyl malate was added thereto as an additive to a stock spinning liquid in a ratio of 3.0% to the acrylic resin. The spinning solution thus prepared was spun by use of a nozzle having 300 holes each 0.10 mm in diameter in spinning baths consisting of the birst bath of an aqueous solution of 45% acetonitrile concentration, the second bath of an aqueous solution of 65% acetonitrile concentration, the third bath of an aqueous solution of 30% acetonitrile concentration, and the fourth bath of water, then dried at 110°C, further thermally drawn out 250% and heat treated at 140°C for 5 minutes to obtain fibers. The acrylic fibers thus obtained were almost free from delustering even when treated in boiling water and excellent also in heat and light resistance, when compared with the acrylic fibers obtained by preparing a spinning solution from the above acrylic resin by adding 3.0% dibutyl tin dilaurate thereto and spinning said solution in spinning baths consisting of the first bath of an aqueous solution of 65% acetonitrile concentration, the second bath of an aqueous solution of 50% acetonitrile concentration, and the third bath of water.

EXAMPLE 27

An acrylic resin (specific viscosity 0.301 at 30°C of a 2.0 g/l cyclohexanone solution) consisting of 31.0% acrylonitrile, 68.0% vinylidene chloride, and 1.0% sodium allyl sulfonate was dissolved in acetone so as to be 20.0% in resin concentration, and dibutyl tin bismonooctyl malate was added thereto as an additive to a spinning solution in a ratio of 4.0% to the acrylic resin. The spinning solution thus prepared was spun by use of a nozzle having 300 holes each 0.10 mm in diameter in spinning baths consisting of the first bath of an aqueous solution of 30% acetone concentration, the second bath of an aqueous solution of 70% acetone concentration, the third bath of an aqueous solution of 40% acetone concentration, and the fourth bath of water, then dried at 120°C, further thermally drawn out 300% and heat treated at 150°C for 5 minutes. The acrylic fibers thus obtained were almost free from delustering even when treated in boiling water and were excellent also in heat and light resistance, when compared with the acrylic fibers obtained by preparing a spinning solution from the above acrylic resin by adding 4.0 % dibutyl tin distearate thereto as an additive and spinning said solution with an ordinary spinning method comprises the first spinning bath of an aqueous solution of 40% acetone concentration, the second bath of an aqueous solution of 55% acetone concentration, the third bath of an aqueous solution of 30% acetone concentration and the fourth bath of water.

EXAMPLE 28

An acrylic resin (specific viscosity 0.321 at 30°C of a 2.0 g/l cyclohexanone solution) consisting of 40.0% acrylonitrile, 56.5% vinylidene chloride, 3.0% methyl methacrylate and 0.5% sodium parastyrene sulfonate was dissolved in acetone so as to be 20.0% in resin concentration, and dibutyl tin bismonomethyl malate in the form of an additive to a spinning solution was added thereto in a ratio of 3.0% to the acrylic resin. The spinning solution thus prepared was spun by use of a nozzle having 300 holes each 0.10 mm in diameter in spinning baths consisting of the first bath of an aqueous solution of 20% acetone concentration, the second bath of an aqueous solution of 85% acetone concentration, the third bath of an aqueous solution of 30% acetone concentration, the fourth bath of an aqueous solution of 10% acetone concentration and the fifth bath of water, then dried at 120°C, further thermally drawn out 300% and heat treated at 150°C for 5 minutes. The acrylic fibers thus obtained showed little or no delustering even when treated in boiling water and were excellent also in heat and light resistance, when compared with the acrylic fibers produced from the above acrylic resin by an ordinary spinning bath concentration composition shown in the contrast in Example 27.

EXAMPLE 29

An acrylic resin (specific viscosity o.311 at 30°C of a 2.0 g/l dimethylformamide solution) consisting of 75% acrylonitrile, 24.0% vinyl chloride, and 1.0% sodium parastyrene sulfonate was dissolved in dimethylformamide so as to be 20.0% in resin concentration, and dibutyl tin malate in the form of an additive to a stock spinning liquid was added thereto in a ratio of 1.5% to the acrylic resin. The spinning solution thus prepared was spun by use of a nozzle having 300 holes each 0.10 mm in diameter in spinning baths consisting of the first bath of an aqueous solution of 20% dimethylformamide concentration, the second bath of an aqueous solution of 70% dimethylformamide concentration, the third bath of an aqueous solution of 45% dimethylformamide concentration, and the fourth bath of water, then dried at 110°C, further thermally drawn out 300% and heat treated at 150°C for 5 minutes to obtain fibers. The acrylic fibers obtained showed little or no delustering even when treated in boiling water and were fibers of superior quality, when compared with the acrylic fibers produced from said acrylic resin by an ordinary spinning method shown in the contrast in Example 26.

EXAMPLE 30

An acrylic resin (specific viscosity 0.345 at 30°c of a 2.0 g/l dimethylformamide solution) consisting of 49.0% acrylonitrile, 50.5% vinylidene chloride, and 0.5% sodium methacroyloxybenzene sulfonate was dissolved in a mixed solvent of dimethylformamide and acetonitrile (ratio by weight 50 : 50) so as to be 20.0% in resin concentration, and dibutyl tin bismonolauryl malate in the form of an additive to a spinning solution was added thereto in a ratio of 4.0% to the acrylic resin. The spinning solution thus prepared was spun by use of a nozzle having 300 holes each 0.10 mm in diameter in spinning baths consisting of the first bath of an aqueous solution of 20% said mixed solvent concentration, the second bath of an aqueous solution of 80% said mixed solvent concentration, the third bath of an aqueous solution of 30% said mixed solvent concentration, the fourth bath of an aqueous solution of 10% said mixed solvent concentration and the fifth bath of water, then dried at 120°C, further thermally drawn out 300% and heat treated at 140°C for 5 minutes to obtain fibers. The acrylic fibers thus obtained showed little or no delustering even when treated in boiling water and were excellent also in heat and light resistance, when compared with the acrylic fibers produced from said acrylic resin by an ordinary spinning bath concentration composition shown in the contrast in Example 26.

While the foregoing described illustrative embodiments of the invention, numerous variations and modifications thereof would be evident to one skilled in the art. All such modifications and variations are to be considered as being within the spirit and scope of the invention.

What is claimed is:

1. Method of manufacturing modacrylic fibers comprising the steps of
    A. dissolving in an organic solvent selected from the group consisting of acetone, acetonitrile, dimethylformamide and mixtures thereof a copolymer consisting essential of
a. 30 to 80 weight percent acrylonitrile,
b. 70 to 20 weight percent vinyl chloride or vinylidene chloride, and
c. 0 to 3 weight percent ethylenically unsaturated monomers having a hydrophillic group and selected from the group consisting of sodium sulfopropyl methacrylate, sodium parastyrene sulfonate, sodium methacryloxybenzene sulfonate, sodium allyl sulfonate, sodium methallyl sulfonate, sodium acrylate, sodium itaconate and mixtures thereof, said copolymer being in a concentration of from 18 to 25%;
B. adding 0.2 to 30.0 weight percent based on the weight of said copolymer of a homopolymer of glycidyl methacrylate or a copolymer consisting essentially of 30 weight percent or more of glycidyl methacrylate polymerized with one or more ethylenically unsaturated monomer selected from the group consisting of methyl acrylate, methyl methacrylate, acrylonitrile, vinyl acetate, vinyl chloride, vinylidene chloride, styrene, vinyl pyrrolidone and the like in an amount of 70 weight percent or less, wherein the specific viscosity of said homopolymer or copolymer of glycidyl methacrylate is from 0.01 to 0.50 as measured at 30°C in 2.0 to 4.0 g/l acetone solution;
C. spinning the resulting spinning solution in at least first and second baths comprising one or more said solvents in concentrations of less than 60 weight percent and 61 to 85 weight percent respectively;
D. leading the thus obtained coagulated filaments successively through one or more subsequent baths containing 60 weight percent or less of said solvent thereby to remove said solvent and to wash said filaments;
E. drying said filaments at about 100° to 135°C;
F. stretching said filaments 2 to 4 times its length at a temperature of about 100° to 135°C; and
G. heat treating said filaments at a temperature of about 135° to 155°C.

2. Method of claim 1, wherein said one or more subsequent baths comprise a third bath having a solvent concentration of about 60%, and one or more baths subsequent thereto having concentrations of solvents in successively lower amounts.

3. Method of claim 1, wherein said homopolymer or copolymer of glycidyl methacrylate is added in an amount of from 0.5 to 5.0 weight percent based on the weight of said copolymer.

4. Method of claim 1, wherein said filaments are dried at a temperature of between 110°C and 125°C, stretched at about 250 to 300 percent, and heat treated at a temperature of about 140°C to 150°C for about 5 minutes.

5. Method of claim 1, wherein the concentration of said solvent in said first bath is from 10 to 50 weight percent and wherein the concentration of said solvent in said second bath is from 63 to 85 weight percent.

6. Method of claim 5, wherein said third and a fourth bath are used, said third bath having said solvent concentration of from 20 to 55 weight percent and said fourth bath having said solvent concentration of from 10 to 30 weight percent.

7. Method of claim 1, wherein said copolymer of glycidyl methacrylate consists essentially of 50 weight percent or more of glycidyl methacrylate and 50 weight percent or less of said one or more ethylenically unsaturated monomer.

* * * * *